United States Patent
Hikone et al.

(10) Patent No.: US 12,487,016 B2
(45) Date of Patent: Dec. 2, 2025

(54) REFRIGERATION CYCLE APPARATUS

(71) Applicant: Mitsubishi Electric Corporation, Tokyo (JP)

(72) Inventors: Takahito Hikone, Tokyo (JP); Naoya Mukaitani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 49 days.

(21) Appl. No.: 18/683,888

(22) PCT Filed: Oct. 25, 2021

(86) PCT No.: PCT/JP2021/039273
§ 371 (c)(1),
(2) Date: Feb. 15, 2024

(87) PCT Pub. No.: WO2023/073758
PCT Pub. Date: May 4, 2023

(65) Prior Publication Data
US 2025/0129981 A1    Apr. 24, 2025

(51) Int. Cl.
*F25B 49/02* (2006.01)
*F24H 4/02* (2022.01)
*F24H 15/242* (2022.01)

(52) U.S. Cl.
CPC .............. *F25B 49/02* (2013.01); *F24H 4/02* (2013.01); *F24H 15/242* (2022.01); *F25B 2700/19* (2013.01)

(58) Field of Classification Search
CPC .... F25B 49/02; F25B 2700/19; F24H 15/242; F24H 4/02
See application file for complete search history.

(56) References Cited

U.S. PATENT DOCUMENTS

2021/0003306 A1    1/2021   Yanachi et al.

FOREIGN PATENT DOCUMENTS

| EP | 2840331 A1 | 2/2015 | |
| EP | 2918923 A1 | 9/2015 | |
| EP | 3211330 A1 | 8/2017 | |
| EP | 3789686 A1 | 3/2021 | |
| GB | 2595378 A  * | 11/2021 | ............ F25B 25/005 |
| JP | H06-011144 A | 1/1994 | |

(Continued)

OTHER PUBLICATIONS

Kosuke, Chilling unit and cold/warm water system, 2019, Full Document (Year: 2019).*

(Continued)

*Primary Examiner* — Nael N Babaa
(74) *Attorney, Agent, or Firm* — Posz Law Group, PLC

(57) ABSTRACT

A refrigeration cycle apparatus includes a refrigerant circuit, a water circuit, a water heat exchanger, and a controller. The water circuit includes: a water pump; an inlet-side pressure sensor configured to detect an inlet-side water pressure that is a pressure of the heat medium which flows into the water heat exchanger; and an outlet-side pressure sensor configured to detect an outlet-side water pressure that is a pressure of the heat medium that flows out from the water heat exchanger. The controller is configured to determine whether air enters the water circuit or not based on the inlet-side water pressure and the outlet-side water pressure.

5 Claims, 9 Drawing Sheets

(56) References Cited

FOREIGN PATENT DOCUMENTS

| JP | 2003-269174 A | 9/2003 | |
|---|---|---|---|
| JP | 2008-164247 A | 7/2008 | |
| JP | 2010-230260 A | 10/2010 | |
| JP | 2016-107952 A | 6/2016 | |
| JP | 2020-085368 A | 6/2020 | |
| JP | 2020-173064 A | 10/2020 | |
| WO | WO-2019211905 A1 * | 11/2019 | ............. F24F 11/84 |
| WO | 2020/148887 A1 | 7/2020 | |

OTHER PUBLICATIONS

Satoru, Air conditioning device, 2018, Full Document (Year: 2018).*
Extended European Search Report dated Nov. 22, 2024 issued for the corresponding European Patent Application No. 21962309.7.
International Search Report of the International Searching Authority mailed Dec. 7, 2021 for the corresponding International Application No. PCT/JP2021/039273 (and English translation).

* cited by examiner

REFRIGERATION CYCLE APPARATUS

CROSS REFERENCE TO RELATED APPLICATION

This application is a U.S. national stage application of PCT/JP2021/039273 filed on Oct. 25, 2021, the contents of which are incorporated herein by reference.

TECHNICAL FIELD

The present invention relates to a refrigeration cycle apparatus provided with a water circuit.

BACKGROUND ART

In a refrigeration cycle system that includes a refrigeration cycle apparatus such as an air-conditioning apparatus provided with a water circuit, in the case where, for example, an air vent valve is not provided, air easily enters the water circuit. When air enters the water circuit during operation, there is a possibility that a pump will lock due to a leak of water from a mechanical seal or generation of rust. In the past, in an actual place where an air-conditioning system is installed, a failure occurring in the water pump, for example, such a pump lock as described above, has been dealt with after occurrence of the failure in the water pump.

Patent Literature 1 describes a technique in which the level of water in a makeup tank is detected by a water-level sensor, and circulation of water in a water circuit is controlled based on the result of the above detection to release air from the water circuit, thereby reducing occurrence of a failure in the water pump.

CITATION LIST

Patent Literature

Patent Literature 1: Japanese Unexamined Patent Application Publication No. Hei 6-11144

SUMMARY OF INVENTION

Technical Problem

However, in the case where a failure in a water pump is dealt with after occurrence of the failure as in the related art, each time a failure occurs in the water pump, a serviceman will come to a place where the water pump is installed, and replace the water pump by a new one, thus increasing the repair cost.

Furthermore, a method described in Patent Literature 1 is intended to determine that release of air from the water circuit is completed; that is, it is not intended to determine whether air enters the water circuit or not. Therefore, if release of air is not appropriately performed, the water pump continues to operate, with air contained in the water pump. Thus, there is a possibility that a failure will occur in the water pump.

The present disclosure is applied in view of the above problem of the related art, and relates to a refrigeration cycle apparatus that can prevent occurrence of a failure in a water pump by detecting in advance whether air enters a water circuit or not.

Solution to Problem

A refrigeration cycle apparatus according to one embodiment of the present disclosure includes: a refrigerant circuit in which refrigerant is circulated; a water circuit in which a heat medium is circulated; a water heat exchanger configured to cause heat exchange to be performed between the refrigerant and the heat medium; and a controller configured to control circulation of the refrigerant and circulation of the heat medium. The water circuit includes: a water pump configured to circulate the heat medium; an inlet-side pressure sensor provided on an inlet side of the water heat exchanger for the heat medium, and configured to detect an inlet-side water pressure that is a pressure of the heat medium that flows into the water heat exchanger; and an outlet-side pressure sensor provided on an outlet side of the water heat exchanger for the heat medium, and configured to detect an outlet-side water pressure that is a pressure of the heat medium that flows out from the water heat exchanger. The controller is configured to determine whether air enters the water circuit or not based on the inlet-side water pressure and the outlet-side water pressure.

Advantageous Effects of Invention

According to the present disclosure, it is determined whether air enters the water circuit or not on the basis of an inlet-side water pressure on an inlet side of the water heat exchanger that is an inlet side for a heat medium and an outlet-side water pressure on an outlet side of the water heat exchanger that is an outlet side for the heat medium. Thus, since it is detected in advance whether air enters the water circuit or not, it is possible to prevent occurrence of a failure in the water pump.

DESCRIPTION OF EMBODIMENTS

Figure 1:
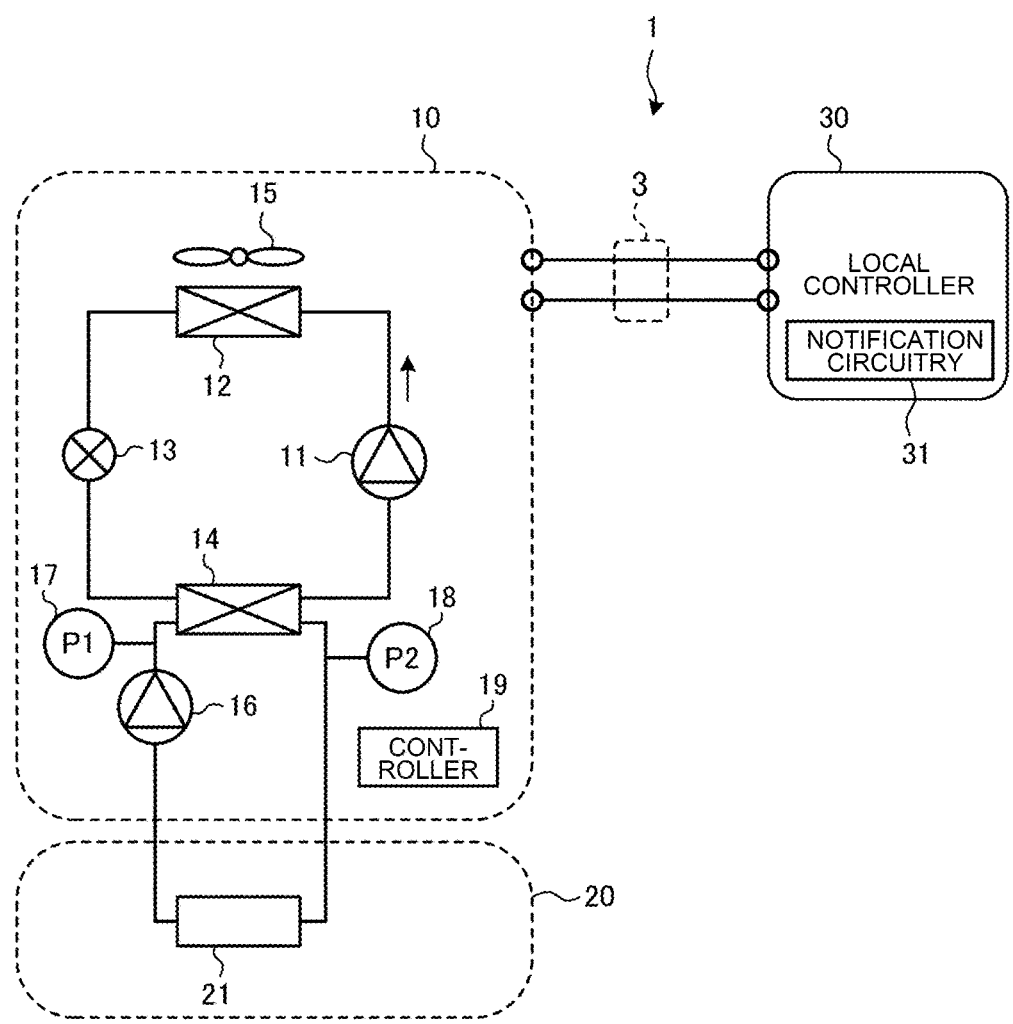
FIG. 1 is a circuit diagram illustrating an example of the configuration of an air-conditioning apparatus according to Embodiment 1.

Embodiments will be described with reference to the drawings. In the present disclosure, descriptions concerning the embodiments are not limiting, and various modifications can be made without departing from the gist of the present disclosure. The present disclosure encompasses all combinations of combinable ones of the configurations described below regarding the embodiments. Furthermore, in each of figures in the drawings, components that are the same as or equivalent to those in a previous figure or previous figures are denoted by the same reference signs. The same is true of the entire text of the present specification.

Embodiment 1

A refrigeration cycle apparatus according to Embodiment 1 will be described. The refrigeration cycle apparatus according to Embodiment 1 includes a water circuit in which water is circulated as a heat medium, and makes, when air enters the water circuit, a notification indicating the entrance of air. Furthermore, the refrigeration cycle apparatus includes a refrigerant circuit in which refrigerant is circulated. The refrigeration cycle apparatus is, for example, an air-conditioning apparatus or a refrigeration machine. The following description is made by referring to by way of example the case where the refrigeration cycle apparatus is the air-conditioning apparatus.

Configuration of Air-Conditioning Apparatus

FIG. 1 is a circuit diagram illustrating an example of the configuration of an air-conditioning apparatus according to Embodiment 1. An air-conditioning apparatus 1 conditions air in an air-conditioning target space. As illustrated in FIG. 1, the air-conditioning apparatus 1 includes an outdoor unit 10, an indoor unit 20, and a local controller 30. The air-conditioning apparatus 1 and the local controller 30 are connected by transmission lines 3.

Outdoor Unit 10

The outdoor unit 10 includes a compressor 11, an air heat exchanger 12, an expansion valve 13, a water heat exchanger 14, a fan 15, a water pump 16, an inlet-side pressure sensor 17, an outlet-side pressure sensor 18, and a controller 19. The indoor unit 20 includes a load 21.

The compressor 11, the air heat exchanger 12, the expansion valve 13, and the water heat exchanger 14 are connected by refrigerant pipes, whereby a refrigerant circuit is formed in which the refrigerant is circulated. Furthermore, the water pump 16, the water heat exchanger 14, and the load 21 are connected by pipes, whereby the water circuit is formed in which water serving as a heat medium is circulated. It should be noted that the heat medium that flows in the water circuit may be, for example, brine. The following description is made by referring to by way of example the case where water is used as the heat medium.

The compressor 11 sucks low-temperature and low-pressure refrigerant, compresses the sucked refrigerant to change it into high-temperature and high-pressure refrigerant, and discharges the high-temperature and high-pressure refrigerant. The compressor 11 is, for example, an inverter compressor whose operating frequency is changed by the controller 19 and which is thus controlled in capacity that is the delivery rate of the refrigerant per unit time.

The air heat exchanger 12 causes heat exchange to be performed between the refrigerant and air send by the fan 15. To be more specific, the air heat exchanger 12 operates as a condenser that transfers heat of the refrigerant to the air. The fan 15 is driven by a motor (not illustrated), and sends air to the air heat exchanger 12. The rotation frequency of the fan 15 is controlled by the controller 19, whereby the flow rate of air to be sent to the air heat exchanger 12 is adjusted.

The water heat exchanger 14 causes heat exchange to be performed between refrigerant that flows in the refrigerant circuit connected to a refrigerant-side passage and water serving as a heat medium that flows in the water circuit, which will be described later and which is connected to a water-side passage. The water heat exchanger 14 operates as an evaporator that evaporates the refrigerant and cools water with heat of evaporation that is generated when the refrigerant is evaporated.

The expansion valve 13 reduces the pressure of the refrigerant to expand the refrigerant. The expansion valve 13 is, for example, an electronic expansion valve whose opening degree can be controlled.

The water pump 16 is driven by a motor (not illustrated), and supplies sucked water to the water heat exchanger 14. In such a manner, the water pump 16 circulates water in the water circuit.

The inlet-side pressure sensor 17 is provided on a heat-medium inlet side of the water heat exchanger 14 and detects an inlet-side water pressure P1. The inlet-side water pressure P1 is the pressure of water that is a heat medium that flows into the water heat exchanger 14. The outlet-side pressure sensor 18 is provided on a heat-medium outlet side of the water heat exchanger 14 and detects an outlet-side water pressure P2. The outlet-side water pressure P2 is the pressure of water that is a water medium that flows out from the water heat exchanger 14.

It should be noted that the above description is made by referring to by way of example the case where the outdoor unit 10 is an air-cooled chilling unit in which refrigerant is made by the compressor 11 to flow in the refrigerant circuit. This is not limiting. For example, the outdoor unit 10 may be a free cooling unit in which a fluid such as brine is made to flow by a pump.

The controller 19 controls the entire air-conditioning apparatus 1 on the basis of various information including information obtained by detection by the inlet-side pressure sensor 17 and the outlet-side pressure sensor 18. In particular, it should be noted that in Embodiment 1, the controller 19 determines whether air enters the water circuit or not based on pressures of water flowing into and out of the water heat exchanger 14 that are detected by the inlet-side pressure sensor 17 and the outlet-side pressure sensor 18.

Figure 2:
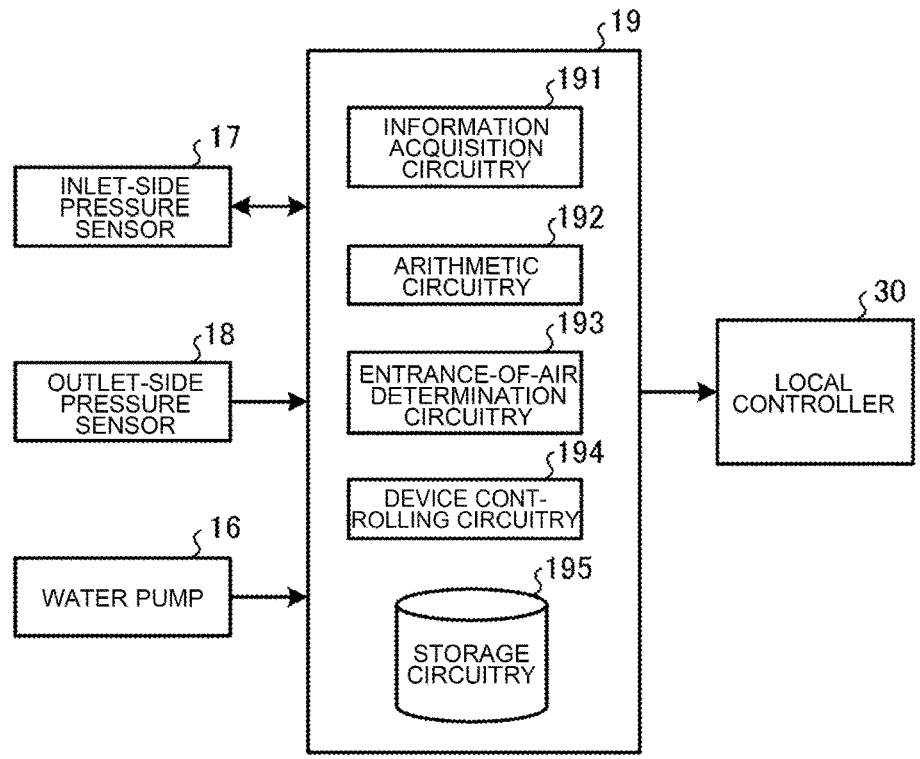
FIG. 2 is a function block diagram illustrating an example of the configuration of a controller as illustrated in FIG. 1.

FIG. 2 is a function block diagram illustrating an example of the configuration of the controller as illustrated in FIG. 1. As indicated in FIG. 2, the controller 19 includes information acquisition circuitry 191, arithmetic circuitry 192, entrance-of-air determination circuitry 193, device controlling circuitry 194, and storage circuitry 195. The controller 19 fulfills various functions by running software on an arithmetic device such as a microcomputer, or is hardware such as a circuit device that fulfills the functions. In the following description, of the functions of the controller 19, functions related to characteristic processing in Embodiment 1 are referred to.

The information acquisition circuitry 191 acquires information obtained by detection by each of various sensors and other devices provided at the air-conditioning apparatus 1. In Embodiment 1, the information acquisition circuitry 191 acquires the inlet-side water pressure P1 detected by the inlet-side pressure sensor 17, the outlet-side water pressure P2 detected by the outlet-side pressure sensor 18, and the operating frequency fpump of the water pump 16.

The arithmetic circuitry 192 calculates various values required for execution of an entrance-of-air detection processing, which will be described later, based on various information acquired by the information acquisition circuitry 191. In Embodiment 1, the arithmetic circuitry 192 calculates a first pressure difference $\Delta P1$ that is the difference between the inlet-side water pressure P1 and the outlet-side water pressure P2. Furthermore, the arithmetic circuitry 192 calculates a measured water flow rate Qw1 that is an actual measurement value of the flow rate of water that flows in the water heat exchanger 14. Also, the arithmetic circuitry 192 calculates a first theoretical water flow rate Qw2 that is a theoretical value of the flow rate of water that flows in the water heat exchanger 14.

The entrance-of-air determination circuitry 193 compares the measured water flow rate Qw1 and the first theoretical water flow rate Qw2 calculated by the arithmetic circuitry 192 with each other, and determines whether air enters the water circuit or not based on the result of the above comparison. To be more specific, for example, when the measured water flow rate Qw1 is lower than the first theoretical water flow rate Qw2, the entrance-of-air determination circuitry 193 determines that air enters the water circuit.

The device controlling circuitry 194 controls each of components provided in the air-conditioning apparatus 1. Furthermore, in Embodiment 1, the device controlling circuitry 194 outputs a notification signal indicating that air enters the water circuit to the local controller 30 through the transmission line 3, based on the result of determination made by the entrance-of-air determination circuitry 193.

The storage circuitry 195 stores, for example, various values and, arithmetic equations for use by circuitry provided in the controller 19. In Embodiment 1, the storage circuitry 195 stores in advance, for example, functions that are used in the case where the arithmetic circuitry 192 calculates the measured water flow rate Qw1 and the first theoretical water flow rate Qw2.

Figure 3:
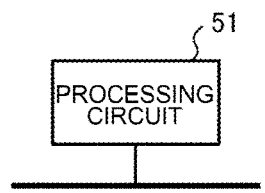
FIG. 3 is a hardware configuration diagram illustrating an example of the configuration of the controller as illustrated in FIG. 2.

FIG. 3 is a hardware configuration diagram illustrating an example of the controller as illustrated in FIG. 2. In the case where each of functions of the controller 19 is fulfilled by hardware, the controller 19 as illustrated in FIG. 2 is a processing circuit 51 as illustrated in FIG. 3. Each of functions of the information acquisition circuitry 191, the arithmetic circuitry 192, the entrance-of-air determination circuitry 193, the device controlling circuitry 194, and the storage circuitry 195 as illustrated in FIG. 2 is fulfilled by the processing circuit 51.

In the case where each of the above functions is fulfilled by hardware, the processing circuit 51 is, for example, a single-component circuit, a composite circuit, a programmed processor, a parallel programmed processor, an application specific integrated circuit (ASIC), a field-programmable gate array (FPGA), or a combination of these circuits. The functions of the information acquisition circuitry 191, the arithmetic circuitry 192, the entrance-of-air determination circuitry 193, the device controlling circuitry 194, and the storage circuitry 195 may be fulfilled by respective processing circuits 51 or may be fulfilled by a single processing circuit 51.

Figure 4:
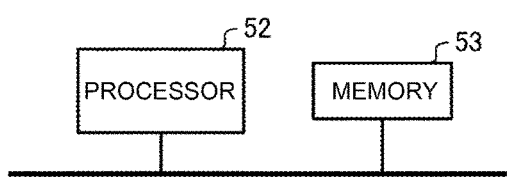
FIG. 4 is a hardware configuration diagram illustrating another example of the configuration of the controller as illustrated in FIG. 2.

FIG. 4 is a hardware configuration diagram illustrating another example of the configuration of the controller as illustrated in FIG. 2. In the case where each of the functions of the controller 19 is fulfilled by software, the controller 19 as illustrated in FIG. 2 includes a processor 52 and a memory 53 as illustrated in FIG. 4. The functions of the information acquisition circuitry 191, the arithmetic circuitry 192, the entrance-of-air determination circuitry 193, the device controlling circuitry 194, and the storage circuitry 195 are fulfilled by the processor 52 and the memory 53.

In the case where each of the above functions is fulfilled by software, the functions of the information acquisition circuitry 191, the arithmetic circuitry 192, the entrance-of-air determination circuitry 193, the device controlling circuitry 194, and the storage circuitry 195 are fulfilled by software, firmware, or a combination of software and firmware. The software and the firmware are written as programs and stored in the memory 53. The processor 52 fulfills each of the functions of those circuitry by reading and running an associated program stored in the memory 53.

The memory 53 is, for example, a nonvolatile or volatile semiconductor memory such as a random access memory (RAM), a read only memory (ROM), a flash memory, an erasable and programmable ROM (EPROM), or electrically erasable and programmable ROM (EEPROM). Alternatively, the memory 53 may be a removable record medium such as a magnetic disc, a flexible disc, an optical disc, a compact disc (CD), Mini Disc (MD), or a digital versatile disc (DVD).

Indoor Unit 20

Re-referring to FIG. 1, the load 21 is a device that uses heat supplied by water. As the load 21, for example, an air-conditioning apparatus, a floor heating system, or a water heater is used.

Local Controller 30

The local controller 30 is a management device that controls, for example, operation of the air-conditioning apparatus 1. For example, in the local controller 30, software is caused to run on an arithmetic device such as a microcomputer, thereby fulfilling each of various functions, or the local controller 30 is hardware such as a circuit device that fulfills each of the various functions.

The local controller 30 is connected to, for example, the outdoor unit 10, and includes notification circuitry 31. When receiving a notification signal from the outdoor unit 10 through the transmission line 3, the notification circuitry 31 gives an alarm indicating that air enters the water circuit. The notification circuitry 31 may be, for example, a light emitting diode (LED) that visually makes a notification for, for example, a user, or a voice output module such as a speaker that makes a notification with voice for the user.

It should be noted that although it is described above with respect to an example illustrated in FIG. 1 that the controller 19 is provided in the outdoor unit 10, this is not limiting. The controller 19 may be provided in, for example, the indoor unit 20. In this case, the local controller 30 is connected to the indoor unit 20.

Operation of Air-Conditioning Apparatus 1

Next, operation of the air-conditioning apparatus 1 having the above configuration will be described. First, refrigerant that flows in the refrigerant circuit in the outdoor unit 10 is compressed by the compressor 11 and then discharged from the compressor 11. The refrigerant discharged from the compressor 11 flows into the air heat exchanger 12. The refrigerant that has flowed into the air heat exchanger 12 exchanges heat with air supplied by the fan 15, and is thus condensed while transferring heat to the air, whereby the refrigerant is cooled. The refrigerant then flows out from the air heat exchanger 12.

The refrigerant that has flowed out from the air heat exchanger 12 is decompressed and expanded by the expansion valve 13, and flows out from the expansion valve 13. The refrigerant that has flowed out from the expansion valve 13 flows into the refrigerant-side passage of the water heat exchanger 14. The refrigerant that has flowed into the water heat exchanger 14 exchanges heat with water that flows in the water-side passage, and receives heat from the water and thus evaporates. The refrigerant then flows out from the water heat exchanger 14. The refrigerant that has flowed out from the water heat exchanger 14 is sucked into the compressor 11. Thereafter, regarding the refrigerant in the refrigerant circuit, the above cycle is repeated.

On the other hand, when the water pump 16 is driven, water that circulates in the water circuit is sent from the water pump 16, and flows into the water-side passage of the water heat exchanger 14. The water that has flowed into the water heat exchanger 14 exchanges heat with refrigerant that flows in the refrigerant-side passage and is thus cooled. The water then flows out from the water heat exchanger 14.

The water that has flowed out from the water heat exchanger 14 flows into the load 21 of the indoor unit 20. Heat of the water that has flowed into the load 21 is used by the load 21, and flows out from the load 21. The water that has flowed out from the load 21 is sucked into the water pump 16. Thereafter, regarding water in the water circuit, the above cycle is repeated.

Entrance-of-Air Detection Processing

The entrance-of-air detection processing according to Embodiment 1 will be described. In the case where air enters the water circuit, the flow rate of water that flows through the water-side passage in the water heat exchanger 14 is lower than in the case where air does not enter the water circuit. That is, in this case, the flow rate of water that actually flows is lower than a theoretical flow rate of water. In view of this point, in the air-conditioning apparatus 1 according to Embodiment 1, the entrance-of-air detection processing to detect whether air enters the water circuit is performed by comparison between the actual water flow rate and theoretical water flow rate.

Figure 5:
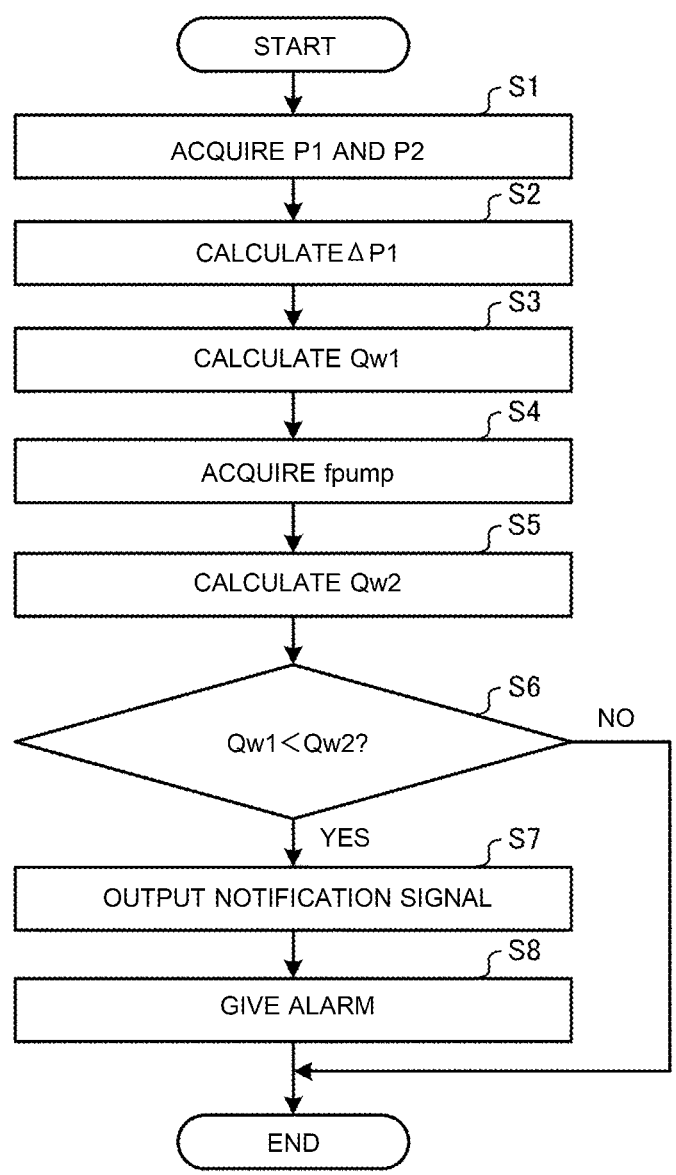
FIG. 5 is a flow chart indicating an example of the flow of an entrance-of-air detection processing by the air-conditioning apparatus according to Embodiment 1.

FIG. 5 is a flow chart indicating an example of the flow of the entrance-of-air detection processing by the air-conditioning apparatus according to Embodiment 1. First, in step S1, the information acquisition circuitry 191 of the controller 19 acquires the inlet-side water pressure P1 that is detected by the inlet-side pressure sensor 17 and that is the pressure of water that flows into the water heat exchanger 14. Furthermore, the information acquisition circuitry 191 acquires the outlet-side water pressure P2 that is detected by the outlet-side pressure sensor 18 and that is the pressure of water that flows out from the water heat exchanger 14.

In step S2, the arithmetic circuitry 192 calculates the first pressure difference ΔP1 on the basis of the inlet-side water pressure P1 and the outlet-side water pressure P2 acquired by the information acquisition circuitry 191. The first pressure difference ΔP1 is the difference between a water pressure on an inlet side of the water heat exchanger 14 and a water pressure on an outlet side of the water heat exchanger 14, and is calculated using an equation (1) indicated as follows:

$$\Delta P1 = P1 - P2 \qquad (1)$$

In step S3, the arithmetic circuitry 192 calculates the measured water flow rate Qw1 on the basis of the calculated first pressure difference ΔP1. The measured water flow rate Qw1 is an actual measurement value of the flow rate of water that flows in the water heat exchanger 14, and is calculated using an equation (2) indicated below. In the equation (2), f (ΔP1) is a function of the first pressure difference ΔP1 that is determined depending on the characteristics of the water heat exchanger 14, and the function f (ΔP1) is stored in the storage circuitry 195 in advance. The function f (ΔP1) is obtained by, for example, an experiment.

$$Qw1 = f(\Delta P1) \qquad (2)$$

Figure 6:
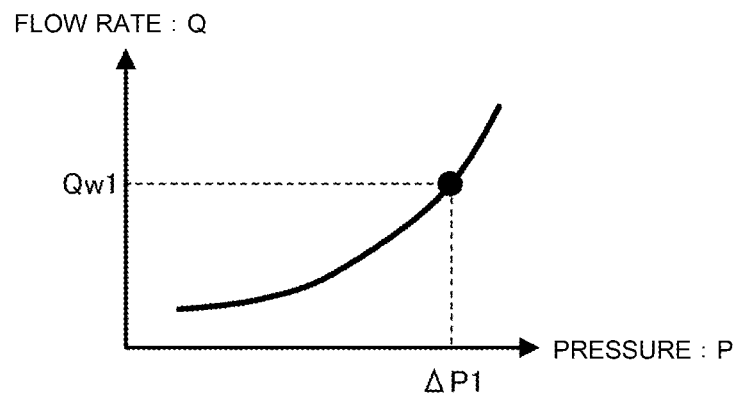
FIG. 6 is a graph for explanation of the relationship between a first pressure difference and a water flow rate in a water heat exchanger.

FIG. 6 is a graph for explanation of the relationship between the first pressure difference and the water flow rate in the water heat exchanger. In FIG. 6, the horizontal axis represents the first pressure difference in water that flows into and flows out from the water heat exchanger 14, and the vertical axis represents the flow rate of water that flows in the water heat exchanger 14. As indicated in FIG. 6, the measured water flow rate Qw1 in the water heat exchanger 14 relative to the first pressure difference ΔP1 is determined from the function obtained from the characteristics of the water heat exchanger 14.

Re-referring to FIG. 5, in step S4, the information acquisition circuitry 191 acquires the operating frequency fpump of the water pump 16. In step S5, the arithmetic circuitry 192 calculates the first theoretical water flow rate Qw2 on the basis of the operating frequency fpump of the water pump 16 and the inlet-side water pressure P1 of the water heat exchanger 14. The first theoretical water flow rate Qw2 is a theoretical value of the flow rate of water that flows in the water heat exchanger 14, and is calculated using an equation (3) indicated below. In the equation (3), f (fpump, P1) is a function determined depending on the PQ characteristic of the water pump 16, and the function f (fpump, P1) is stored in the storage circuitry 195 in advance. It should be noted that in this example, a suction-side pressure of the suction-side pressure of the water pump 16 corresponds to atmospheric pressure.

$$Qw2 = f(fpump, P1) \qquad (3)$$

Figure 7:
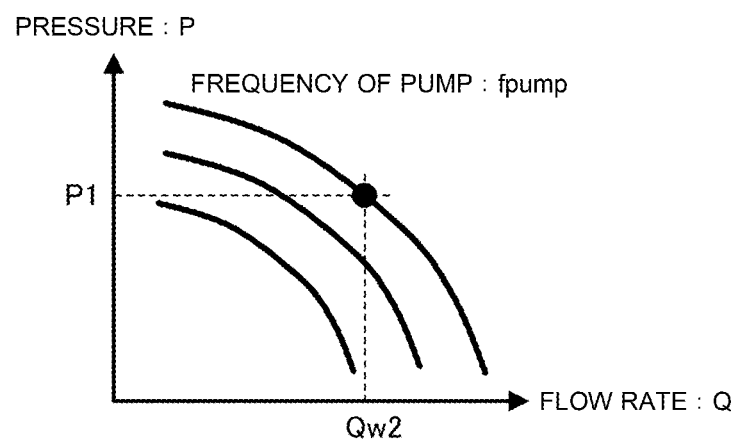
FIG. 7 is a graph for explanation of the relationship between the operating frequency of a water pump, an inlet-side water pressure at the water heat exchanger, and a water flow rate of the water heat exchanger.

FIG. 7 is a graph for explanation of the relationship between the operating frequency of the water pump, an inlet-side water pressure at the water heat exchanger, and the water flow rate in the water heat exchanger. In FIG. 7, the horizontal axis represents a theoretical flow rate of water that flows in the water heat exchanger 14, and the vertical axis represents the pressure of water that flows into the water heat exchanger 14. As indicated in FIG. 7, where fpump is the operating frequency of the water pump 16, the first theoretical water flow rate Qw2 in the water heat exchanger 14 relative to the inlet-side water pressure P1 is determined from the function obtained from the PQ characteristic of the water pump 16.

Re-referring to FIG. 5, in step S6, the entrance-of-air determination circuitry 193 compares the measured water flow rate Qw1 and the first theoretical water flow rate Qw2 which are calculated by the arithmetic circuitry 192, with each other, and determines whether the measured water flow rate Qw1 is lower than the first theoretical water flow rate Qw2 or not.

When the measured water flow rate Qw1 is lower than the first theoretical water flow rate Qw2 (YES in step S6), the entrance-of-air determination circuitry 193 determines that air enters the water circuit. Then, the processing proceeds to step S7. By contrast, when the measured water flow rate Qw1 is higher than or equal to the first theoretical water flow rate Qw2 (NO in step S6), the entrance-of-air determination circuitry 193 determines that air does not enter the water circuit. The series of processes end.

In some cases, the measured water flow rate Qw1 calculated in step S3 is higher than the flow rate of water that actually flows in the water heat exchanger 14. Thus, the entrance-of-air determination circuitry 193 compares a value obtained by multiplying the measured water flow rate Qw1 by a constant α that is smaller than 1, with the first theoretical water flow rate Qw2, and determines whether air enters the water circuit or not, based on the result of the above comparison. In this case, the constant α is determined based on, for example, the result of an experiment, and is set to, for example, 0.8 or less.

In step S7, the device controlling circuitry 194 produces a notification signal indicating that air enters the water circuit, on the basis of the result of the above determination made by the entrance-of-air determination circuitry 193, and output the notification signal to the local controller 30. In step S8, when receiving the notification signal output from the device controlling circuitry 194, the local controller 30 causes the notification circuitry 31 to give an alarm indicating that air enters the water circuit.

As described above, in the air-conditioning apparatus 1 according to Embodiment 1, it is determined whether air enters the water circuit or not, on the basis of the inlet-side water pressure P1 on the inlet side of the water heat exchanger 14 for water and the outlet-side water pressure P2 on the outlet side of the water heat exchanger 14, the inlet side and the outlet side of the water heat exchanger 14 being inlet and outlet sides for water. Therefore, since it is detected in advance whether air enters the water circuit or not, it is possible to prevent occurrence of a failure in the water pump 16.

Embodiment 2

Embodiment 2 will be described. In the air-conditioning apparatus 1 according to Embodiment 2, the entrance-of-air detection processing is performed using the pump head of the water pump 16. In this regard, Embodiment 2 is different from embodiment 1. It should be noted that regarding Embodiment 2, components that are the same as those in Embodiment 2 will be denoted by the same reference signs, and their detailed explanations will thus be omitted.

Configuration of Air-Conditioning Apparatus 1

The configuration of the air-conditioning apparatus 1 according to Embodiment 2 is that of Embodiment which is illustrated in FIG. 1. It should be noted that in Embodiment 2, regarding some functions, the controller 19 is different from the controller of Embodiment 1.

In Embodiment 2, the arithmetic circuitry 192 (see FIG. 2) of the controller 19 calculates a pump head ΔPp of the water pump 16 on the basis of the first pressure difference ΔP1 and the measured water flow rate Qw1 which the arithmetic circuitry 192 calculates in the same manner in Embodiment 1. The pump head ΔPp is the amount of pressure rising by the water pump 16.

The entrance-of-air determination circuitry 193 compares with the value "0", a value obtained by subtracting the pump head ΔPp calculated by the arithmetic circuitry 192 from the inlet-side water pressure P1 acquired by the information acquisition circuitry 191, and determines whether air enters the water circuit or not on the basis of the result of the above comparison. To be more specific, for example, when the value "P1-ΔPp" obtained by subtracting the pump head ΔPp from the inlet-side water pressure P1 is less than 0, the entrance-of-air determination circuitry 193 determines that air enters the water circuit.

The storage circuitry 195 stores in advance functions which are used by the arithmetic circuitry 192 when the arithmetic circuitry 192 calculates the measured water flow rate Qw1 and the pump head ΔPp of the water pump 16.

Entrance-of-Air Detection Processing

The entrance-of-air detection processing according to Embodiment 2 will be described. In the air-conditioning apparatus 1 according to Embodiment 2, the entrance-of-air detection processing to detect that air enters the water circuit is performed on the basis of a suction pressure of the water pump 16.

Figure 8:
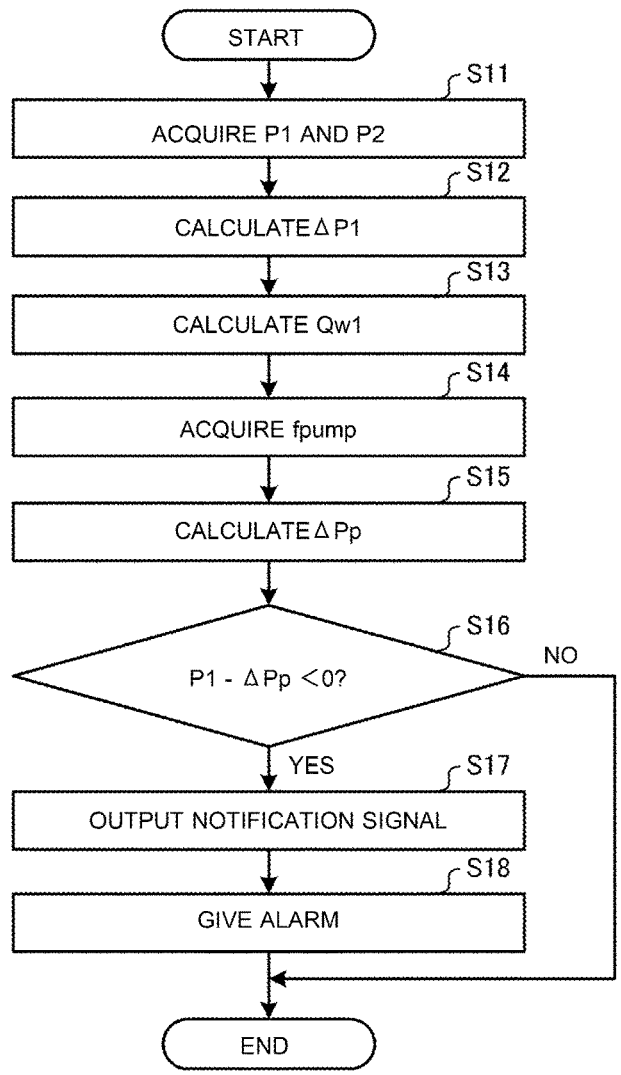
FIG. 8 is a flow chart indicating an example of the flow of the entrance-of-air detection processing by an air-conditioning apparatus according to Embodiment 2.

FIG. 8 is a flow chart indicating an example of the flow of the entrance-of-air detection processing by the air-conditioning apparatus according to Embodiment 2. First, in step S11, the information acquisition circuitry 191 of the controller 19 acquires the inlet-side water pressure P1 detected by the inlet-side pressure sensor 17. Furthermore, the information acquisition circuitry 191 acquires the outlet-side water pressure P2 detected by the outlet-side pressure sensor 18.

In step S12, the arithmetic circuitry 192 calculates the first pressure difference ΔP1 on the basis of the inlet-side water pressure P1 and the outlet-side water pressure P2 acquired by the information acquisition circuitry 191. The first pressure difference ΔP1 is calculated using the equation (1) as in Embodiment 1.

In step S13, the arithmetic circuitry 192 calculates the measured water flow rate Qw1 on the basis of the calculated first pressure difference ΔP1. The measured water flow rate Qw1 is calculated using the equation (2) as in Embodiment 1.

In step S14, the information acquisition circuitry 191 acquires the operating frequency fpump of the water pump 16. In step S15, the arithmetic circuitry 192 calculates the pump head ΔPp of the water pump 16 on the basis of the measured water flow rate Qw1 calculated in step S13 and the operating frequency fpump of the water pump 16 which is acquired in step S14. The pump head ΔPp is calculated using an equation (4) indicated below. In the equation (4), f (Qw1, fpump) is a function determined depending on the PQ characteristic of the water pump 16, and the function f (Qw1, fpump) is stored in the storage circuitry 195 in advance.

$$\Delta Pp = f(Qw1, fpump) \qquad (4)$$

Figure 9:
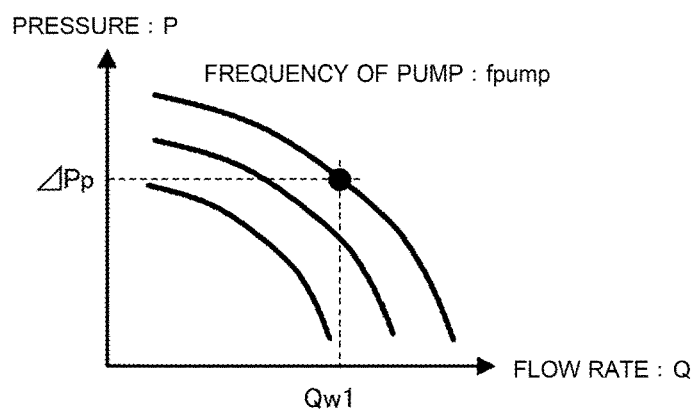
FIG. 9 is a graph for explanation of the relationship between the operating frequency, the pump head of the water pump, and an actual measured water flow rate.

FIG. 9 is a graph for explanation of the relationship between the operating frequency of the water pump, the pump head of the water pump, and the actual measured flow rate. In FIG. 9, the horizontal axis represents the actual flow rate of water that flows in the water heat exchanger 14 and the vertical axis represents the pump head of the water pump 16. As indicated in FIG. 9, where fpump is the operating frequency of the water pump 16, the pump head ΔPp of the water pump 16 relative to the measured water flow rate Qw1 of the water heat exchanger 14 is determined from the function obtained from the PQ characteristic of the water pump 16.

Re-referring to FIG. 8, in step S16, the entrance-of-air determination circuitry 193 compares with the value "0", the value "P1-ΔPp" obtained by subtracting the pump head ΔPp of the water pump which is calculated by the arithmetic circuitry 192, from the inlet-side water pressure P1 acquired by the information acquisition circuitry 191. The entrance-of-air determination circuitry 193 determines whether P1-ΔPp is less than 0 or not. It should be noted that P1-ΔPp is a suction pressure of the water pump 16. This is derived from the following: a pressure obtained by adding the suction pressure of the water pump 16 and the pump head ΔPp is a transferring pressure of the water pump 16, that is, the inlet-side water pressure P1 detected by the inlet-side pressure sensor 17.

When P1-ΔPp is less than 0 (YES in step S16), this means that the suction pressure of the water pump 16 is a negative pressure, and the entrance-of-air determination circuitry 193 thus determines that air enters the water circuit. Thus, the processing proceeds to step S17. In contrast, when P1-ΔPp is greater than or equal to 0 (NO in step S16), the entrance-of-air determination circuitry 193 determines that air does not enter the water circuit, and the series of processes end.

In step S17, the device controlling circuitry 194 produces a notification signal indicating that air enters the water circuit, on the basis of the result of the determination by the entrance-of-air determination circuitry 193, and outputs the notification signal to the local controller 30. In step S18, when receiving the notification signal output from the device controlling circuitry 194, the local controller 30 causes the notification circuitry 31 to give an alarm indicating that air enters the water circuit.

As described above, in the air-conditioning apparatus 1 according to Embodiment 2, the pump head ΔP of the water pump 16 is calculated on the basis of the measured water flow rate Qw1 that is an actual measurement value of the flow rate of water which flows in the water heat exchanger 14 and the operating frequency fpump of the water pump 16. Furthermore, when the value obtained by subtracting the pump head ΔPp from the inlet-side water pressure P1 is less than 0, it is determined that air enters the water circuit. Thus, since it is detected in advance that air enters the water circuit as in Embodiment 1, it is possible to prevent a failure from occurring in the water pump 16.

Embodiment 3

Next, Embodiment 3 will be described. In the air-conditioning apparatus 1 according to Embodiment 3, the entrance-of-air detection processing is performed using the suction pressure of the water pump 16. In this regard, Embodiment 3 is different from Embodiments 1 and 2. It should be noted that in Embodiment 3, components that are the same as Embodiment 1 or 2 will be denoted by the same reference signs, and their detailed description will thus be omitted.

Configuration of Air-Conditioning Apparatus 1

Figure 10:
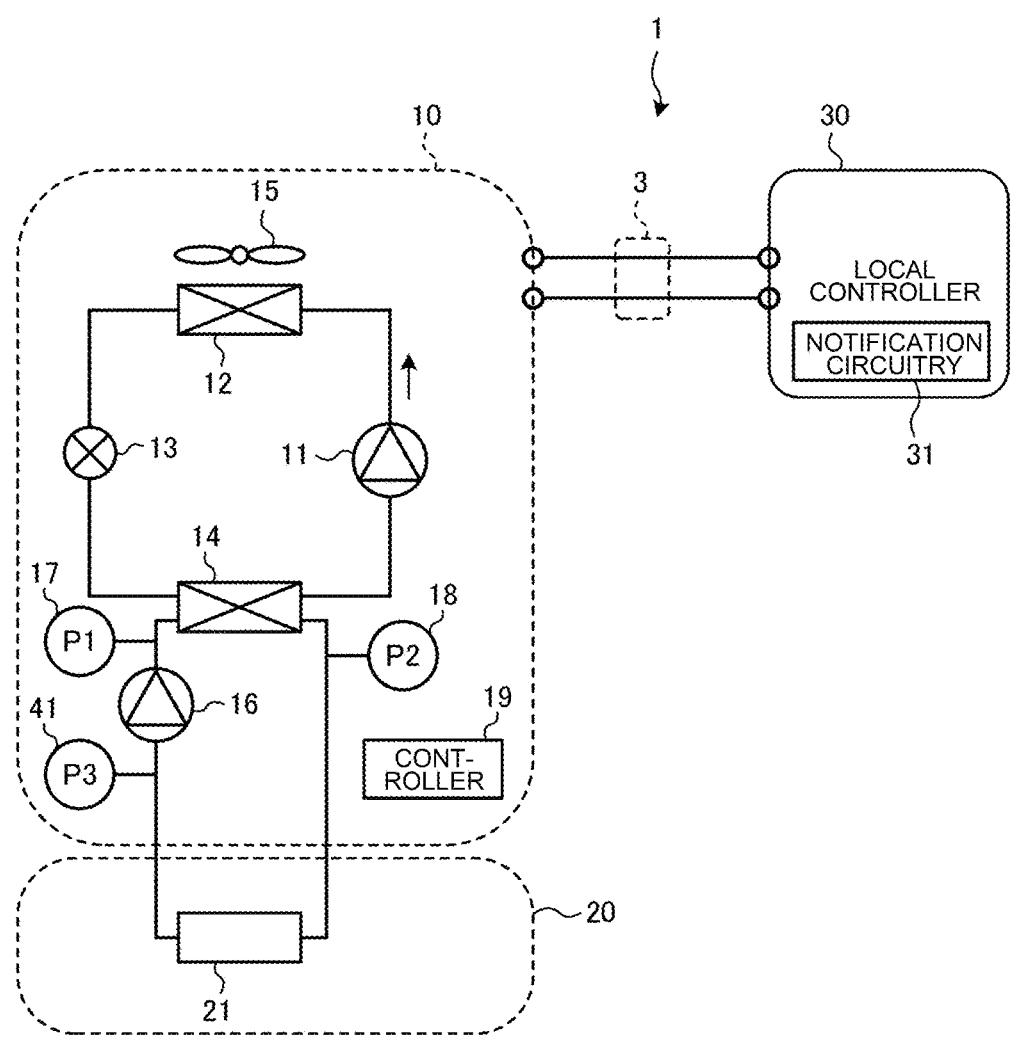
FIG. 10 is a circuit diagram illustrating an example of the configuration of an air-conditioning apparatus according to Embodiment 3.

FIG. 10 is a circuit diagram illustrating an example of the configuration of the air-conditioning apparatus according to Embodiment 3. As illustrated in FIG. 10, the air-conditioning apparatus 1 includes the air-conditioning apparatus 1 which includes the outdoor unit 10 and the indoor unit 20 and the local controller 30.

In Embodiment 3, the outdoor unit 10 includes the compressor 11, the air heat exchanger 12, the expansion valve 13, the water heat exchanger 14, the fan 15, the water pump 16, the inlet-side pressure sensor 17, the outlet-side pressure sensor 18, the suction pressure sensor 41, and the controller 19. The suction pressure sensor 41 is provided on a heat-medium inlet side of the water pump 16, and detects a suction pressure, that is, the pressure of water that is sucked into the water pump 16.

Figure 11:
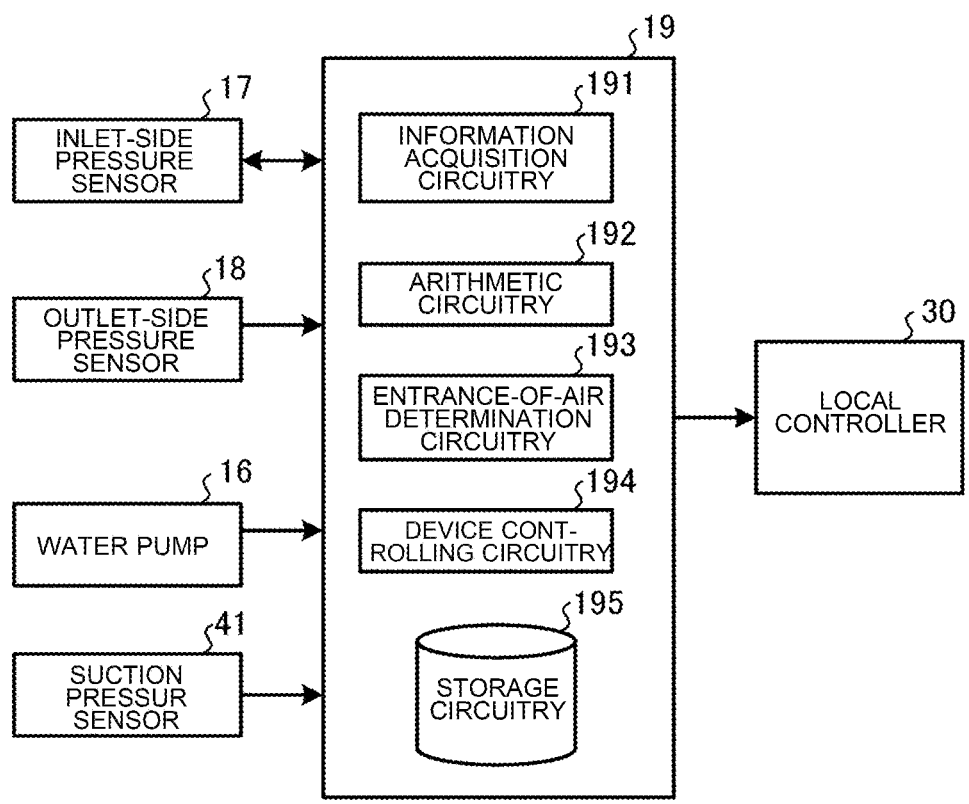
FIG. 11 is a function block diagram indicating an example of the configuration of a controller as illustrated in FIG. 10.

FIG. 11 is a function block diagram indicating an example of the configuration of the controller as illustrated in FIG. 10. The controller 19 includes the information acquisition circuitry 191, the arithmetic circuitry 192, the entrance-of-air determination circuitry 193, the device controlling circuitry 194, and the storage circuitry 195 as in Embodiments 1 and 2. The functions of the controller 19 are fulfilled when software is caused to run on an arithmetic device such as a microcomputer, or the controller 19 is hardware such as a circuit device that fulfills its functions. Of the functions of the controller 19, only functions related to characteristic processing in Embodiment 1 will be described.

The information acquisition circuitry 191 acquires a suction pressure P3 of the water pump 16 which is detected by the suction pressure sensor 41, in addition to the inlet-side water pressure P1, the outlet-side water pressure P2, and the operating frequency fpump of the water pump 16.

The arithmetic circuitry 192 calculates various values that are required for execution of the entrance-of-air detection processing, on the basis of various information acquired by the information acquisition circuitry 191. In Embodiment 3, the arithmetic circuitry 192 calculates a second theoretical water flow rate Qw3 in addition to the first pressure difference ΔP1 and the measured water flow rate Qw1.

The entrance-of-air determination circuitry 193 compares the measured water flow rate Qw1 and the second theoretical water flow rate Qw3 which are calculated by the arithmetic circuitry 192 with each other, and determines whether air enters the water circuit or not on the basis of the result of the comparison. To be more specific, for example, when the measured water flow rate Qw1 is lower than the second theoretical water flow rate Qw3, the entrance-of-air determination circuitry 193 determines that air enters the water circuit.

The storage circuitry 195 stores, for example, various values and arithmetic equations for use by the plurality of circuitry provided in the controller 19. In Embodiment 3, the storage circuitry 195 stores in advance, for example, functions that are applied when the arithmetic circuitry 192 calculates the measured water flow rate Qw1 and the second theoretical water flow rate Qw3.

Entrance-of-Air Detection Processing

The entrance-of-air detection processing according to Embodiment 3 will be described. In the air-conditioning apparatus 1 according to Embodiment 3, in the entrance-of-air detection processing, an actual flow rate and a theoretical flow rate are compared with each other as in Embodiment 1, and it is detected whether air enters the water circuit on the basis of the result of the above comparison.

Figure 12:
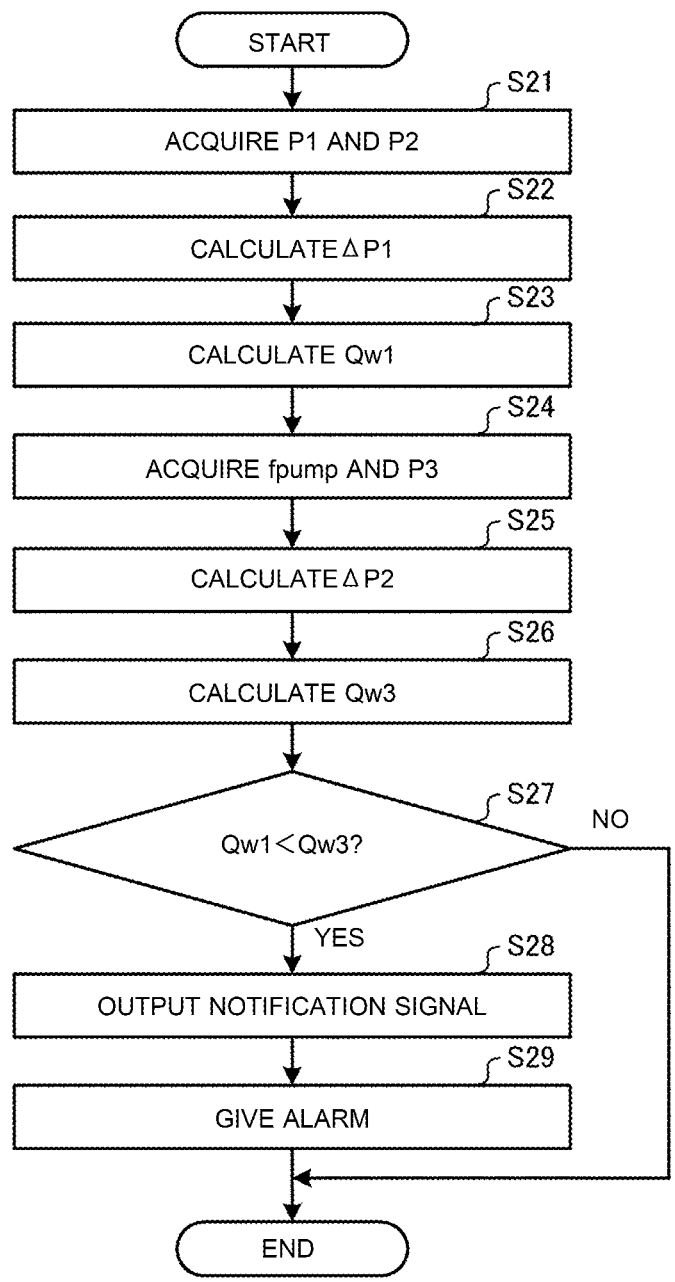
FIG. 12 is a flow chart indicating an example of the flow of the entrance-of-air detection processing by the air-conditioning apparatus according to Embodiment 3.

FIG. 12 is a flow chart indicating an example of the flow of the entrance-of-air detection processing by the air-conditioning apparatus according to Embodiment 3. First, in step S21, the information acquisition circuitry 191 of the controller 19 acquires the inlet-side water pressure P1 detected by the inlet-side pressure sensor 17. Furthermore, the information acquisition circuitry 191 acquires the outlet-side water pressure P2 detected by the outlet-side pressure sensor 18.

In step S22, the arithmetic circuitry 192 calculates the first pressure difference ΔP1 on the basis of the inlet-side water pressure P1 and the outlet-side water pressure P2 acquired by the information acquisition circuitry 191. The first pressure difference ΔP1 is calculated using the equation (1) as in Embodiments 1 and 2.

In step S23, the arithmetic circuitry 192 calculates the measured water flow rate Qw1 on the basis of the calculated first pressure difference ΔP1. The measured water flow rate Qw1 is calculated using the equation (2) as in Embodiments 1 and 2.

In step S24, the information acquisition circuitry 191 acquires the operating frequency fpump of the water pump 16. Furthermore, the information acquisition circuitry 191 acquires a suction pressure that is detected by the suction pressure sensor 41 and that is the pressure of water that is sucked into the water pump 16.

In step S25, the arithmetic circuitry 192 calculates a second pressure difference ΔP2 on the basis of the inlet-side water pressure P1 and the suction pressure P3 which are acquired by the information acquisition circuitry 191. The second pressure difference ΔP2 is the difference between a water pressure on the inlet side of the water heat exchanger 14 and a water pressure on a suction side of the water pump 16, and is calculated using an equation (5) indicated as follows:

$$\Delta P2 = P1 - P3 \qquad (5)$$

In step S26, the arithmetic circuitry 192 calculates the second theoretical water flow rate Qw3 on the basis of the operating frequency fpump of the water pump 16 and the calculated second pressure difference ΔP2. The second theoretical water flow rate Qw3 is a theoretical value of the flow rate of water that flows in the water heat exchanger 14, and is calculated using an equation (6) indicated below. In the equation (6), f (ΔP2, fpump) is a function that is determined based on the PQ characteristic of the water pump 16, and is stored in the storage circuitry 195 in advance.

$$Qw3 = f(\Delta P2, fpump) \qquad (6)$$

Figure 13:
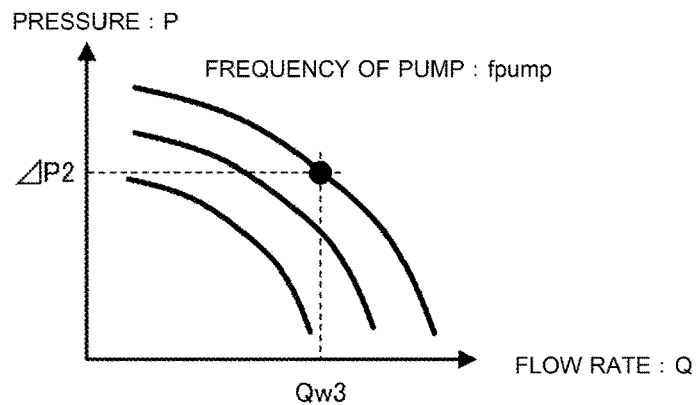
FIG. 13 is a graph for explanation of the relationship between the operating frequency of the water pump, the pressure of the water pump, and the flow rate of water in the water heat exchanger.

FIG. 13 is a graph for explanation of the relationship between the operating frequency of the water pump, the pressure of the water pump, and the flow rate of water in the water heat exchanger. In FIG. 13, the horizontal axis represents a theoretical flow rate of water that flows in the water heat exchanger 14, and the vertical axis represents the pressure of the water pump 16. As indicated in FIG. 13, where fpump is the operating frequency of the water pump 16, the second theoretical water flow rate Qw3 is determined with a function obtained from the PQ characteristic of the water pump 16.

Re-referring to FIG. 12, in step S27, the entrance-of-air determination circuitry 193 compares the measured water flow rate Qw1 and the second theoretical water flow rate Qw3 which are calculated by the arithmetic circuitry 192, with each other, and determines whether the measured water flow rate Qw1 is lower than the second theoretical water flow rate Qw3 or not.

When the measured water flow rate Qw1 is lower than the second theoretical water flow rate Qw3 (YES in step S27), the entrance-of-air determination circuitry 193 determines that air enters the water circuit. Then, the processing proceeds to step S28. In contrast, when the measured water flow rate Qw1 is higher than or equal to the second theoretical water flow rate Qw3 (NO in step S27), the entrance-of-air determination circuitry 193 determines that air does not enter the water circuit, and he series of processes end.

In some cases, the measured water flow rate Qw1 calculated in step S23 is calculated as a higher rate than the flow rate of water that actually flows in the water heat exchanger 14. Thus, the entrance-of-air determination circuitry 193 may compare a value obtained by multiplying the measured water flow rate Qw1 by a constant α that is smaller than 1, with the second theoretical water flow rate Qw3, to determine whether air enters the water circuit or not. In this case, the constant α is determined based on the result of an experiment, and is set to, for example, 0.8 or less.

In step S28, the device controlling circuitry 194 produces a notification signal indicating that air enters the water circuit on the basis of the result of the determination by the entrance-of-air determination circuitry 193, and outputs the notification signal to the local controller 30. In step S29, when receiving the notification signal output from the device controlling circuitry 194, the local controller 30 causes the notification circuitry 31 to give an alarm indicating that air enters the water circuit.

As described above, in the air-conditioning apparatus 1 according to Embodiment 3, the measured water flow rate Qw1 that is an actual measurement value of the flow rate of water that flows in the water heat exchanger 14 and the second theoretical water flow rate Qw3 that is a theoretical value of the flow rate of water that flows in the water heat exchanger 14 are calculated. Then, when the measured water flow rate Qw1 is lower than the second theoretical water flow rate Qw3, it is determined that air enters the water circuit. As a result, as in Embodiments 1 and 2, it is possible to detect beforehand whether air enters the water circuit, and thus prevent a failure from occurring in the water pump 16.

Embodiment 4

Next, Embodiment 4 will be described. In the air-conditioning apparatus 1 according to Embodiment 4, the entrance-of-air detection processing is performed on the basis of variations of the measured water flow rate Qw1, the first theoretical water flow rate Qw2, and the second theoretical water flow rate Qw3. In this regard, Embodiment 4 is different from Embodiments 1 to 3. It should be noted that in Embodiment 4, components that are the same as those in any of Embodiments 1 to 3 will be denoted by the same reference signs, and their detailed descriptions will thus be omitted.

Configuration of Air-Conditioning Apparatus 1

The configuration of the air-conditioning apparatus 1 according to Embodiment 4 is the same as that of Embodiment 3 which is illustrated in FIG. 10. It should be noted that regarding some functions, the controller 19 in Embodiment 4 is different from those of Embodiments 1 to 3.

In Embodiment 4, the arithmetic circuitry 192 of the controller 19 calculates the measured water flow rate Qw1 as in Embodiments 1 to 3. Furthermore, the arithmetic circuitry 192 calculates the first theoretical water flow rate Qw2 as in Embodiment 1. In addition, the arithmetic circuitry 192 calculates the second theoretical water flow rate Qw3 as in Embodiment 3. These water flow rates are calculated at predetermine time intervals.

The storage circuitry 195 stores the measured water flow rate Qw1, the first theoretical water flow rate Qw2, and the second theoretical water flow rate Qw3 which are calculated by the arithmetic circuitry 192. The stored measured water flow rate Qw1, first theoretical water flow rate Qw2, and second theoretical water flow rate Qw3 are each read out by the entrance-of-air determination circuitry 193.

The entrance-of-air determination circuitry 193 compares a current flow rate of water that is calculated by the arithmetic circuitry 192 and a previous flow rate of water that is stored in the storage circuitry 195 with each other, to determine whether air enters the water circuit or not. To be more specific, the entrance-of-air determination circuitry 193 compares the measured water flow rate Qw1, the first theoretical water flow rate Qw2, and the second theoretical water flow rate Qw3 with a previous measured water flow rate Qw1, a previous first theoretical water flow rate Qw2, and a previous second theoretical water flow rate Qw3, respectively, and determines that air enters the water circuit when at least one of the measured water flow rate Qw1, the first theoretical water flow rate Qw2, and the second theoretical water flow rate Qw3 varies from the above associated previous flow rate by a variation 3% or more.

The variation $\beta$ is a set variation set in advance, and indicates the percent by which the current flow rate of water varies from the previous flow rate of water. The variation $\beta$ is set to, for example, 30% or higher in order to prevent erroneous detection with respect to whether air enters the water circuit or not.

Entrance-of-Air Detection Processing

The entrance-of-air detection processing according to Embodiment 4 will be described. In the case where air enters the water circuit, the flow rate of water greatly varies as compared with the case where air does not enter the water circuit. That is, in the case where the flow rate of water at a certain point varies from a previous flow rate of water, it is possible to determine that air enters the water circuit.

In view of the above, in the air-conditioning apparatus 1 according to Embodiment 4, the measured water flow rate Qw1, the first theoretical water flow rate Qw2, and the second theoretical water flow rate Qw3 are calculated at regular intervals, and it is determined whether air enters the water circuit or not on the basis of the variation by which the current value varies from the previous value.

Figure 14:
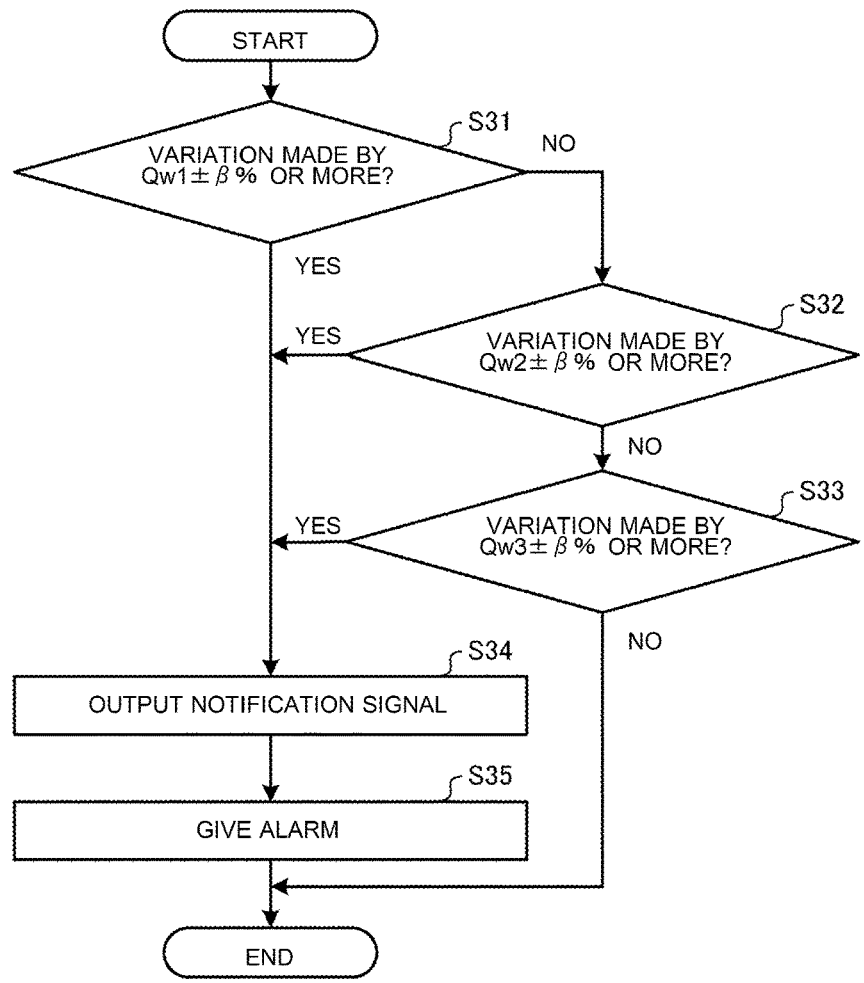
FIG. 14 is a flow chart indicating an example of the flow of the entrance-of-air detection processing by an air-conditioning apparatus according to Embodiment 4.

FIG. 14 is a flow chart indicating an example of the flow of the entrance-of-air detection processing by the air-conditioning apparatus according to Embodiment 4. In Embodiment 4, it is assumed that prior to the processing as indicated in FIG. 14, the measured water flow rate Qw1 is calculated as in Embodiments 1 to 3, the first theoretical water flow rate Qw2 is calculated as in Embodiment 1, and the second theoretical water flow rate Qw3 is calculated as in Embodiment 3. Also, it is assumed that those flow rates are calculated at predetermined time intervals.

In step S31, the entrance-of-air determination circuitry 193 of the controller 19 compares the measured water flow rate Qw1 calculated by the arithmetic circuitry 192 and the previous measured water flow rate Qw1 read out from the storage circuitry 195 with each other. Then, the entrance-of-air determination circuitry 193 determines whether or not the current measured water flow rate Qw1 varies from the previous measured water flow rate Qw1 by the variation $\beta$% or more.

In the case where the current measured water flow rate Qw1 varies from the previous measured water flow rate Qw1 by 3% or more (YES in step S31), the entrance-of-air determination circuitry 193 determines that air enters the water circuit. Then, the processing proceeds to step S34. In contrast, in the case where the current measured water flow rate Qw1 does not vary from the previous measured water flow rate Qw1 by $\beta$ % or more (NO in step S31), the processing proceeds to step S32.

In step S32, the entrance-of-air determination circuitry 193 compares the first theoretical water flow rate Qw2 calculated by the arithmetic circuitry 192 and the previous first theoretical water flow rate Qw2 read out from the storage circuitry 195 with each other. Then, the entrance-of-air determination circuitry 193 determines whether or not the current first theoretical water flow rate Qw2 varies from the previous first theoretical water flow rate Qw2 by the variation $\beta$% or more.

In the case where the current first theoretical water flow rate Qw2 varies from the previous first theoretical water flow rate Qw2 by $\beta$% or more (YES in step S32), the entrance-of-air determination circuitry 193 determines that air enters the water circuit. Then, the processing proceeds to step S34. In contrast, in the case where the current first theoretical water flow rate Qw2 does not vary from the previous first theoretical water flow rate Qw2 by the variation $\beta$% or more (NO in step S32), the processing proceeds to step S33.

In step S33, the entrance-of-air determination circuitry 193 compares the second theoretical water flow rate Qw3 calculated by the arithmetic circuitry 192 and the previous second theoretical water flow rate Qw3 read out from the storage circuitry 195 with each other. Then, the entrance-of-air determination circuitry 193 determines whether or not the current second theoretical water flow rate Qw3 varies from the previous second theoretical water flow rate Qw3 by the variation $\beta$% or more.

In the case where the current second theoretical water flow rate Qw3 varies from the previous second theoretical water flow rate Qw3 by the variation $\beta$ % or more (YES in step S33), the entrance-of-air determination circuitry 193 determines that air enters the water circuit. Then, the processing proceeds to step S34. In contrast, the current second theoretical water flow rate Qw3 does not vary from the previous second theoretical water flow rate Qw3 by the variation $\beta$% or more (NO in step S33), the entrance-of-air determination circuitry 193 determines that air does not enter the water circuit, and the series of processes end.

In step S34, the device controlling circuitry 194 produces a notification signal indicating that air enters the water circuit, on the basis of the result of the comparison by the entrance-of-air determination circuitry 193, and outputs the notification signal to the local controller 30. In step S35, when receiving the notification signal output from the device controlling circuitry 194, the local controller 30 causes the notification circuitry 31 to give an alarm indicating air enters the water circuit.

As described above, in the air-conditioning apparatus 1 according to Embodiment 4, the measured water flow rate Qw1 that is an actual measurement value of the flow rate of water that flows in the water heat exchanger 14, the first theoretical water flow rate Qw2 and the second theoretical water flow rate Qw3 that are theoretical values of the flow rate of water that flows in the water heat exchanger 14 are calculated. Then, in the case where any of the measured water flow rate Qw1, the first theoretical water flow rate Qw2, and the second theoretical water flow rate Qw3 varies from an associated one of the previous measured water flow rate Qw1, the previous first theoretical water flow rate Qw2, and the previous second theoretical water flow rate Qw3 by the set variation $\beta$ or more, it is determined that air enters the water circuit. Thus, as in Embodiments 1 to 3, it is detected beforehand whether air enters the water circuit, and it is therefore possible to prevent a failure from occurring in the water pump 16.

In the present disclosure, although Embodiments 1 to 4 are described above, the descriptions concerning Embodiments 1 to 4 are not limiting, and various modifications and applications can be made without departing from the gist of the present disclosure. Although the descriptions concerning Embodiments 1 to 4 refer to the air-conditioning apparatus provided with the water circuit, they are not limiting. For example, the above entrance-of-air detection processing can be applied to any apparatus, as long as the apparatus is an apparatus provided with a water pump and a water pressure sensor.

Furthermore, regarding Embodiments 1 to 4, although it is described above that the controller 19 performs the entrance-of-air detection processing, it is not limiting. For example, the local controller 30 may be made to have the function of the entrance-of-air detection processing and perform the entrance-of-air detection processing.

REFERENCE SIGNS LIST

1: air-conditioning apparatus, 3: transmission line, 10: outdoor unit, 11: compressor, 12: air heat exchanger, 13: expansion valve, 14: water heat exchanger, 15: fan, 16: water pump, 17: inlet-side pressure sensor, 18: outlet-side pressure sensor, 19: controller, 20: indoor unit, 21: load, 30: local controller, 31: notification circuitry, 41: suction pressure sensor, 51: processing circuit, 52: processor, 53: memory, 191: information acquisition circuitry, 192: arithmetic circuitry, 193: entrance-of-air determination circuitry, 194: device controlling circuitry, 195: storage circuitry

The invention claimed is:

1. A refrigeration cycle apparatus comprising:
a refrigerant circuit in which refrigerant is circulated;
a water circuit in which a heat medium is circulated;
a water heat exchanger configured to cause heat exchange to be performed between the refrigerant and the heat medium; and
a controller configured to control circulation of the refrigerant and circulation of the heat medium,
wherein the water circuit includes
a water pump configured to circulate the heat medium,
an inlet-side pressure sensor provided on an inlet side of the water heat exchanger for the heat medium, and configured to detect an inlet-side water pressure that is a pressure of the heat medium which flows into the water heat exchanger, and
an outlet-side pressure sensor provided on an outlet side of the water heat exchanger for the heat medium, and configured to detect an outlet-side water pressure that is a pressure of the heat medium that flows out from the water heat exchanger, and
wherein the controller includes
arithmetic circuitry configured to calculate an measured water flow rate that is an actual measurement value of a flow rate of the heat medium which flows in the water heat exchanger, on the basis of the inlet-side water pressure and the outlet-side water pressure, and calculate a first theoretical water flow rate that is a theoretical value of the flow rate of the heat medium that flows in the water heat exchanger, on the basis of an operating frequency of the water pump and the inlet-side water pressure, and
entrance-of-air determination circuitry configured to determine whether air enters the water circuit or not on the basis of the measured water flow rate and the first theoretical water flow rate, and
wherein the entrance-of-air determination circuitry that air enters the water circuit when the measured water flow rate is lower than the first theoretical water flow rate.

2. The refrigeration cycle apparatus of claim 1, further comprises a suction pressure sensor configured to detect a suction pressure that is a pressure of the heat medium which is sucked into the water pump,
wherein the controller includes
arithmetic circuitry configured to calculate a measured water flow rate that is an actual measurement value of a flow rate of the heat medium which flows in the water heat exchanger, on the basis of the inlet-side water pressure and the outlet-side water pressure, calculate a first theoretical water flow rate that is a theoretical value of the flow rate of the heat medium which flows in the water heat exchanger, on the basis of an operating frequency of the water pump and the inlet-side water pressure, and calculate a second theoretical water flow rate that is a theoretical value of the flow rate of the heat medium which flows in the water heat exchanger, on the basis of the inlet-side water pressure, the suction pressure, and the operating frequency of the water pump,
entrance-of-air determination circuitry configured to determine whether air enters the water circuit or not on the basis of the measured water flow rate, the first theoretical water flow rate, and the second theoretical water flow rate, and
storage circuitry configured to store the measured water flow rate, the first theoretical water flow rate, and the second theoretical water flow rate, and
wherein the entrance-of-air determination circuitry is configured to determine that air enters the water circuit, when any of the measured water flow rate, the first theoretical water flow rate, and the second theoretical water flow rate varies from an associated one of a previous measured water flow rate, a previous first theoretical water flow rate, and a previous second theoretical water flow rate by a set variation value or more.

3. The refrigeration cycle apparatus of claim 1, further comprising a local controller configured to manage the refrigeration cycle apparatus,
wherein the local controller includes notification circuitry configured to make a notification indicating that air enters the water circuit, when it is determined that air enters the water circuit.

4. A refrigeration cycle apparatus comprising:
a refrigerant circuit in which refrigerant is circulated;
a water circuit in which a heat medium is circulated;
a water heat exchanger configured to cause heat exchange to be performed between the refrigerant and the heat medium; and
a controller configured to control circulation of the refrigerant and circulation of the heat medium,
wherein the water circuit includes
a water pump configured to circulate the heat medium,
an inlet-side pressure sensor provided on an inlet side of the water heat exchanger for the heat medium, and configured to detect an inlet-side water pressure that is a pressure of the heat medium which flows into the water heat exchanger, and an outlet-side pressure sensor provided on an outlet side of the water heat exchanger for the heat medium, and configured to detect an outlet-side water pressure that is a pressure of the heat medium that flows out from the water heat exchanger, wherein the controller includes
- arithmetic circuitry configured to calculate a measured water flow rate that is an actual measurement value of a flow rate of the heat medium which flows in the water heat exchanger, on the basis of the inlet-side water pressure and the outlet-side water pressure, and calculate a pump head of the water pump on the basis of an operating frequency of the water pump, and
- entrance-of-air determination circuitry configured to determine whether air enters the water circuit or not, on the basis of the inlet-side water pressure and the pump head of the water pump, and wherein the entrance-of-air determination circuitry is configured to determine that air enters the water circuit, when a suction pressure of the water pump that is obtained by subtracting the pump head of the water pump from the inlet-side water pressure is less than 0.

5. A refrigeration cycle apparatus comprising:
a refrigerant circuit in which refrigerant is circulated;
a water circuit in which a heat medium is circulated;
a water heat exchanger configured to cause heat exchange to be performed between the refrigerant and the heat medium; and
a controller configured to control circulation of the refrigerant and circulation of the heat medium,
wherein the water circuit includes
a water pump configured to circulate the heat medium,
an inlet-side pressure sensor provided on an inlet side of the water heat exchanger for the heat medium, and configured to detect an inlet-side water pressure that is a pressure of the heat medium which flows into the water heat exchanger,
an outlet-side pressure sensor provided on an outlet side of the water heat exchanger for the heat medium, and configured to detect an outlet-side water pressure that is a pressure of the heat medium that flows out from the water heat exchanger, and
a suction pressure sensor configured to detect a suction pressure that is a pressure of the heat medium which is sucked into the water pump, wherein the controller includes
- arithmetic circuitry configured to calculate a measure water flow rate that is an actual measurement value of a flow rate of the heat medium which flows in the water heat exchanger, on the basis of the inlet-side water pressure and the outlet-side water pressure, and calculate a second theoretical water flow rate that is a theoretical value of the flow rate of the heat medium which flows in the water heat exchanger, on the basis of the inlet-side water pressure, the suction pressure, and the operating frequency of the water pump, and
- entrance-of-air determination circuitry configured to determine whether air enters the water circuit or not on the basis of the measured water flow rate and the second theoretical water flow rate, and wherein the entrance-of-air determination circuitry is configured to determine that air enters the water circuit when the measured water flow rate is lower than the second theoretical water flow rate.

* * * * *